United States Patent
Cheng et al.

[11] Patent Number: 6,157,949
[45] Date of Patent: Dec. 5, 2000

[54] DATA PLACEMENT ON DIRECT ACCESS DEVICES FOR MEDIA SERVERS WITH CYCLIC RE-BROADCAST CAPABILITY

[75] Inventors: Chui Chu Cheng; Chin Cheng Chuo, both of Hsinchu; Jinshuan Eric Lee, Taipei; Chien-Ming Tsao; Yih-Woei Liang, both of Hsinchu; Chih-Yu Chiou, Taipei, all of Taiwan

[73] Assignee: Industrial Technology Research Institute, Taiwan

[21] Appl. No.: 09/086,042

[22] Filed: May 28, 1998

[51] Int. Cl.$^7$ .......................... H04N 7/173; G06F 15/16; H04H 1/02
[52] U.S. Cl. ................. 709/219; 348/7; 348/12; 455/5.1
[58] Field of Search .................. 348/7, 12, 13; 455/4.2, 5.1; 709/217, 218, 219; H04N 7/173

[56] References Cited

U.S. PATENT DOCUMENTS

| | | | |
|---|---|---|---|
| 5,751,883 | 5/1998 | Ottesen et al. | 386/27 |
| 5,757,415 | 5/1998 | Asamizuya et al. | 348/7 |
| 5,815,662 | 9/1998 | Ong | 395/200.47 |
| 5,838,362 | 11/1998 | Furuya et al. | 348/7 |
| 5,870,551 | 2/1999 | Ozden et al. | 395/200.49 |
| 5,870,553 | 2/1999 | Shaw et al. | 395/200.49 |

*Primary Examiner*—John W. Miller
*Attorney, Agent, or Firm*—Proskauer Rose LLP

[57] ABSTRACT

The present invention optimizes data placement in reference to the service of cyclic re-broadcast, typical of a media server. When the media data to be re-broadcast and the cycle of the re-broadcast are known, it is possible, according to the present invention, to calculate the portions of all the media data that will be read simultaneously and place sequentially such portions of data, so that the search time of the read/write head in the data blocks of direct access devices, such as magnetic disks, magnetic disk arrays, read-and-write optical disks, and other storage devices, can be reduced. Using the inventive data placement technology, the search time of the read/write head can be significantly reduced and the efficiency of bandwidth use can be improved, without altering typical hardware devices.

13 Claims, 5 Drawing Sheets

DATA PLACEMENT ON DIRECT ACCESS DEVICES FOR MEDIA SERVERS WITH CYCLIC RE-BROADCAST CAPABILITY

FIELD OF THE INVENTION

The present invention relates to a Near Video-on-Demand system and, more particularly, relates to an efficient data placement method for broadcasting media data using a cyclic re-broadcast technique that reduces the read/write head search time.

BACKGROUND OF THE INVENTION

A Near Video-on-Demand (NVOD) system, which has become increasingly popular, typically broadcasts media data using a cyclic re-broadcast technique which refers to a repetitive broadcast on multiple channels in a cyclic manner having a fixed time interval between channels. In other words, a Near Video-on-Demand system is capable of continuously broadcasting the same movie on several channels at a given interval. Since this system can utilize both the mechanisms of broadcasting and multicasting, the requirement on the network bandwidth is significantly reduced. Furthermore, since there is a fixed interval length between channels during broadcasting, a user can choose where to start the movie by selecting one of the several channels. Also, by shifting between channels, the user can achieve the effect of fast forward or rewind. For instance, a movie with a length of 120 minutes may be broadcast continuously and cyclically on 12 channels, such that there is a ten-minute interval between broadcasting on each channel. If the first channel broadcasts at 12:00 am, the second channel will broadcast at 12:10 am, and so on.

As an example, if a movie is 24 seconds in length, and is being broadcast continuously and cyclically on channels 1, 2, 3, and 4, then there is an interval of 6 seconds between broadcast on each channel. One second of the movie is defined as a block, so that a movie with 24 seconds has 24 blocks in total. Accordingly, the broadcast time differential between the channels is 6 blocks. For purpose of illustration, the blocks are numbered from 0 to 23. As shown in FIG. 1, when channel 1 needs block 0, then block 6, block 12 and block 18 are fed to channel 2, channel 3, and channel 4, respectively.

The following will discuss three popular conventional data placement methods, using the example cited hereinabove, which are: continuous data placement, region-based data to placement, and region-based data placement with block grouping.

FIG. 2 illustrates the access order of the above-mentioned 24 second movie when storing data using the first listed prior art method, continuous data placement. The continuous data placement method refers to the method whereby data is placed continuously in some order so that when channel 1 finishes accessing block 0, the read/write head has to search for block 6 for channel 2, and so on. According to this method, the read/write head must search for the next block every time it finishes accessing a given block, causing a significant time delay required for searching. When this method is applied to a system having continuous and cyclic re-broadcasting capability, a considerable search time is necessary because of the fact that the read/write head has to continuously access the blocks that are located in different sections of the file.

FIG. 3 illustrates the access order of the above-mentioned 24-second movie when storing data according to the second listed prior art method, region-based data placement. The region-based data placement method divides the direct access device into a number of regions and places the divided data into these regions. Because of the nature of the cyclic re-broadcast technique, the data to be broadcast for each channel may be arranged to be placed in a single region. For example, when channel 1 completes accessing the data of block 0, the read/write head can access the data of block 6 for channel 2 in the same region. With the broadcast data regionalized, the search time of the direct access device will be shortened, as will the physical distance since data blocks, which are cyclicly read, are stored in the same physical region. However, when the read/write head moves from one region to another, it is still necessary for the direct access device to search.

FIG. 4 illustrates the access order of the above-mentioned 24 second movie when storing data according to the third listed prior art method, region-based data placement with block grouping. The so-called region-based data placement with block grouping furthers the region-based data placement method by utilizing a block grouping scheme that places together all blocks that are required by all channels at one time, so that the search time between blocks can be reduced. Thus, when channel 1 finishes accessing block 0, the read/write head does not have to search further but access block 6 immediately for channel 2. However, when the system finishes accessing block 18 for channel 4, the read/write head has to search block 1 for channel 1, etc. Thus, frequent searching remains, which causes detrimental delays in NVOD systems.

In addition to the above-mentioned three methods of data placement, a study has also be conducted of additional related prior art publications; however, these publications do not disclose data storage designs for cyclic and continuous broadcasting of a movie.

For example, P. Venka Rangan and Harrick M. Vin's article entitled "Efficient Storage Techniques for Digital Continuous Multimedia" (IEEE Transactions on Knowledge and Data Engineering, Vol. 5, No. 4, 1993), proposes a limit on the data placement method to reduce the search time by the magnet head of a storage device and to increase the system efficiency thereby. In addition, Shahram Ghandeharizodeh, Seon Ho Kim and Cyrus Shahabi's article entitled "On Configuring a Single Disk Continuous Media Servers" (SIGMETRICS95, 1995), proposes a similar concept, referred to as the region-based data placement. However, neither of these methods are designed for the data storage for cyclic and continuous broadcasting of a movie. Nor do either disclose optimizing disk search time.

On the other hand, the article by Meng-Hied Lee, Meng Chang Chen, Jan Ming Ho and Ming Tat Ko entitled "On the Disk Layout of Near Video On Demand System" (Proc. Of the 1997 IS&T/SPIE Symp. On Electronic Imaging: Science and Technology, Conference on Storage and Retrieval for Still Image and Video Database) discloses a method that purportively refines the region-based data placement method by placing the data blocks within a region in a continuous position to reduce the search time by the magnetic head. However, this method has not optimized the data placement to avoid unnecessary search by the magnetic head. In addition, this method limits the video data to the same length and applies to the data placement only in a single hard disk. This is different from the present invention whose direct access device can be a magnetic disk or a magnetic disk array. Moreover, the present invention does not pose any limit on the length of a movie and therefore provides greater practicality in actual applications.

Thus, it is an object of the present invention to overcome the deficiencies and short-comings of the prior art.

SUMMARY OF THE INVENTION

To solve the above-described shortcomings of the prior art, the present invention optimizes data placement in reference to the service of cyclic re-broadcast, typical of a media server. When the media data to be re-broadcast and the cycle of the re-broadcast are known, it is possible, according to the present invention, to calculate the portions of all the media data that will be read simultaneously and place sequentially such portions of data, so that the search time of the read/write head in the data blocks of direct access devices, such as magnetic disks, magnetic disk arrays, read-and-write optical disks, and other storage devices, can be reduced. Using the inventive data placement technology, the search time of the read/write head can be significantly reduced and the efficiency of bandwidth use can be improved, without altering typical hardware devices.

In one embodiment, a method of data placement of media data on at least one direct access device for a media server having a cyclic re-broadcast property (a repetitive broadcast on multiple broadcast channels in a cyclic manner having a fixed time interval between channels) is described. The inventive method includes adjusting the media data so that its length can be divided integrally based on a predetermined number of fixed blocks and on the number of broadcast channels, such that the predetermined number of blocks is an integral multiple of the number of tracks of a direct access device. Next, the media data is divided by the predetermined number of blocks. The direct access device is then formatted into blocks of the predetermined number, and the divided media data blocks are sequentially placed on the formatted direct access, so that said blocks can be sequentially and continuously accessed.

BRIEF DESCRIPTION OF THE DRAWINGS

The following detailed description, given by way of example and not intended to limit the present invention solely thereto, will best be understood in conjunction with the accompanying drawings, in which.

DETAILED DESCRIPTION OF THE PREFERRED EMBODIMENTS

Figure 1:
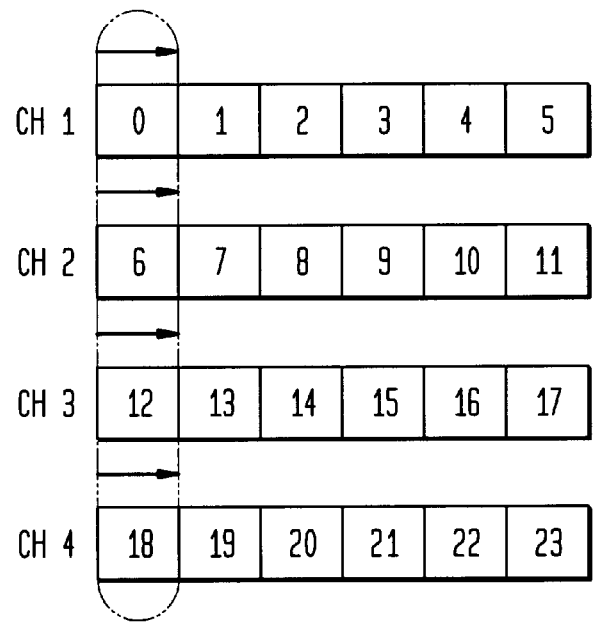
FIG. 1 illustrates the data access order of a single movie on four channels in a conventional Near Video on Demand System.
Figure 2:
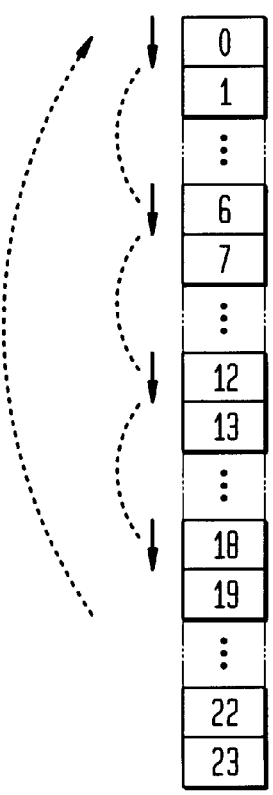
FIG. 2 illustrates the data access order of a single movie on four channels using the conventional continuous data placement method.
Figure 3:
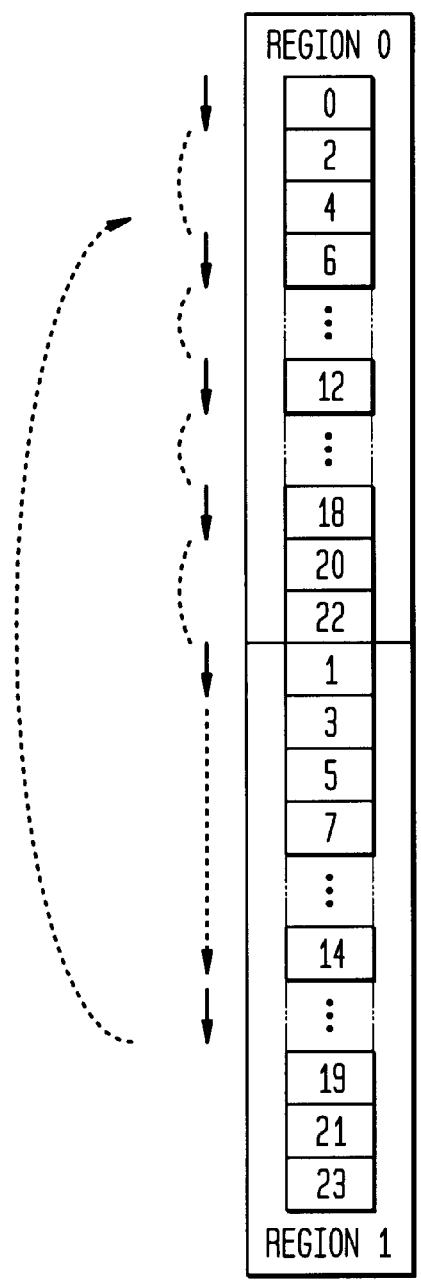
FIG. 3 illustrates the data access order of a single movie on four channels using the region-based data placement method.
Figure 4:
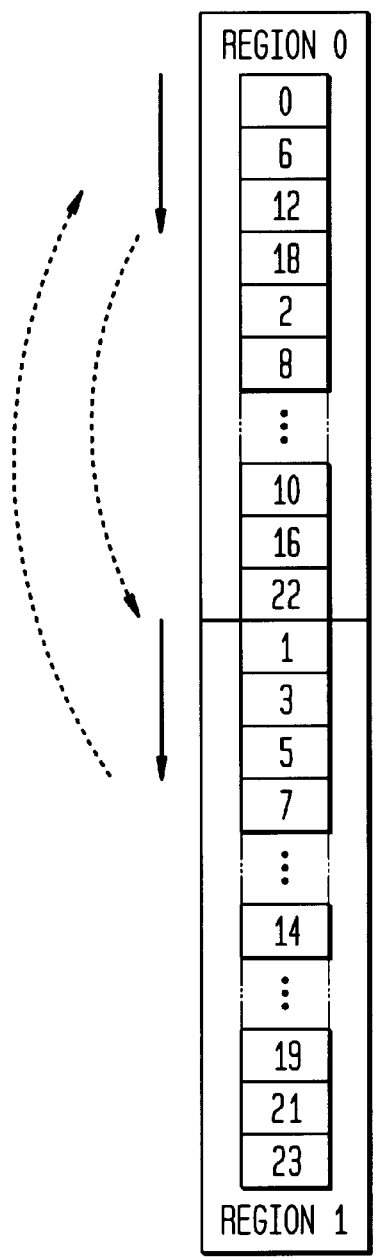
FIG. 4 illustrates the data access order of a single movie on four channels using the region-based data placement method with block grouping.
Figure 5:
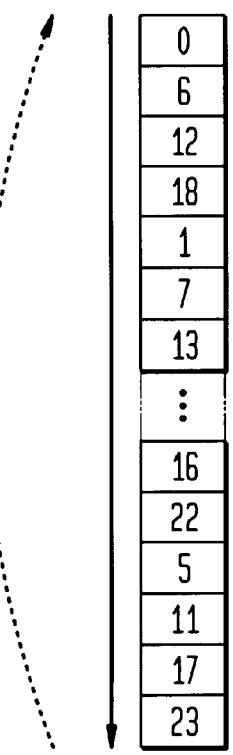
FIG. 5 illustrates the data access order of a single movie on four channels using the invention data placement method according to the present invention.

FIG. 5 illustrates the access order of the above-mentioned 24-second movie when storing data according to the inventive data placement method. The inventive data placement method places data blocks at intervals, so that a direct access device can continuously access blocks 0, 6, 12, and 18 for channels 1, 2, 3 and 4, respectively, and thereafter continue to access blocks 1, 7, 13, and 19 for channels 1, 2, 3 and 4, respectively, etc. When the direct access device finishes accessing blocks 5, 11, 17 and 23, channel 4 has already finished its program and it will continue the re-broadcast from block 0, and channels 1, 2, and 3 will need to continue from blocks 6, 12, and 18, respectively. In this way, the direct access device will only need to search once to access blocks 0, 6, 12, and 18 for channels 4, 1, 2, and 3, respectively. Although there is some change in the order of service, the data required by all channels will be accessed with one service round, and this can be achieved easily using a conventional dual buffer scheme. Thus, using the data placement method proposed by the present invention, the efficiency of the direct access device can be optimized, while the burden of searching time can be minimized.

Figure 6:
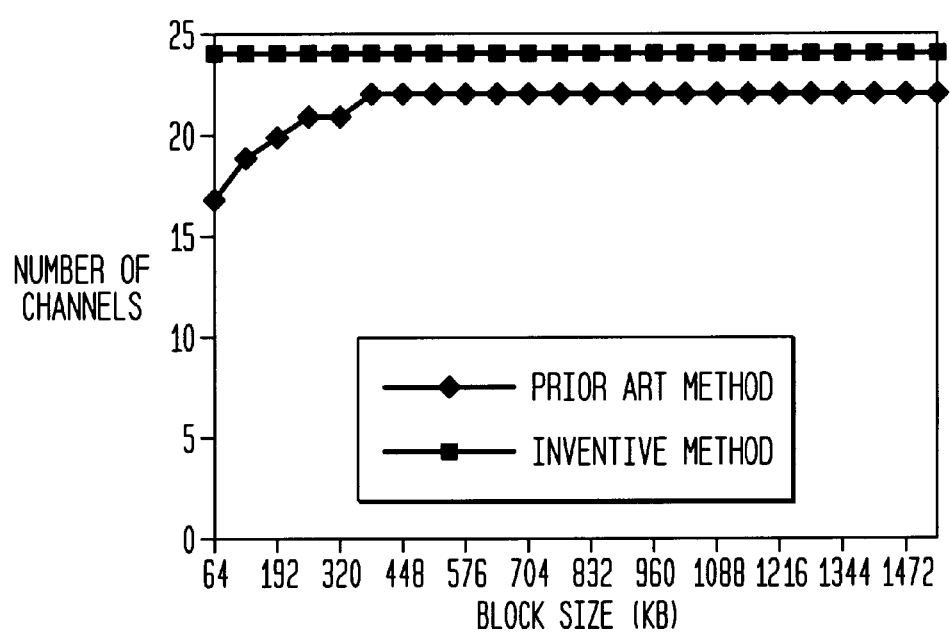
FIG. 6 illustrates a comparison of efficiency between the data placement method of the present invention and the conventional continuous data placement method.

FIG. 6 is a comparison between the continuous data placement method and the method according to the present invention. It can be clearly noted from FIG. 6 that the search time by the direct access device is significantly reduced using the inventive method disclosed herein and that the efficiency of the inventive method is independent from the size of blocks, if a block is assumed (which is a reasonable assumption for media data) to be a multiple of tracks (i.e. magnetic or laser tracks). In contrast, the continuous data placement method shows a very poor efficiency due to a need for excessive searching. Thus, with the same parameters, the present invention can provide a greater number of channels than the continuous data placement method, while using a minimum number of buffer areas to optimize efficiency.

Figure 7:
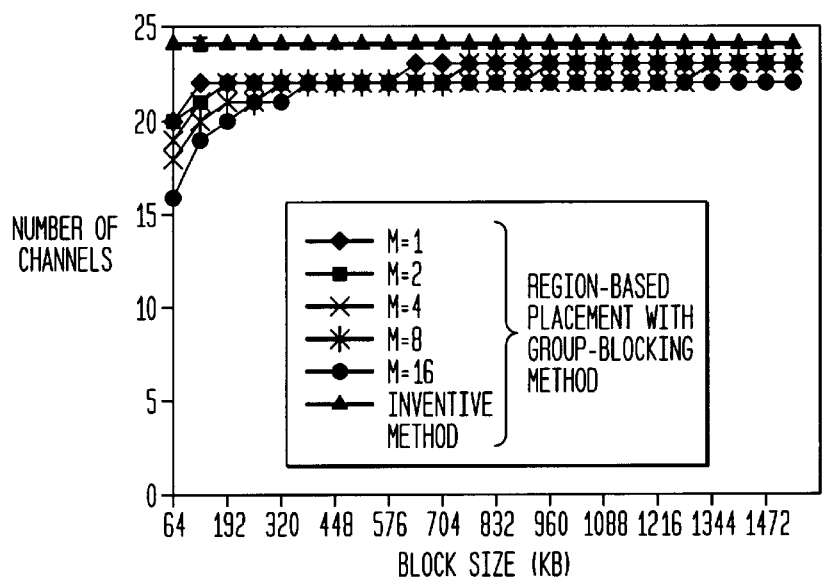
FIG. 7 illustrates a comparison of efficiency between the data placement method of the present invention and the conventional region-based data placement method with block grouping.

FIG. 7 is a comparison between the region-based data placement with block grouping method and the method according to the present invention. It can be noted from FIG. 7 that, although the region-based data placement with blocks grouping method can reduce the search time between blocks on the direct access device, it does not reduce the search time between regions. The efficiency of this method is therefore inferior to that of the present invention. In FIG. 7, M represents the number of regions defined on the direct access device. The greater the value of M is, the smaller the regions will be. The distance of searching by the direct access device is thus reduced and the efficiency of the direct access device will be therefore increased.

The simulation property parameters in FIG. 6 and FIG. 7 are listed as follows. Illustratively, note that the direct access device is a magnetic disk:

Disk capacity=2,000 KB
Ideal disk bandwidth=48,000 KB/sec
Full length of disk search time=0.018 sec
Track to track search time=0.001 sec
Data consumption speed=192 KB/sec.

The present invention proposes three types of data placement. Their concepts are explained as follows. The first type considers the placement of the media data on a single or several direct access devices. The characteristics of this type lies in the fact that each data is placed separately so that the removal or addition of any data will not have any impact on the placement of the other data. The data management is therefore quite simple. In addition, since the access order of each data file is considered separately, access of any media data will naturally be the optimal data placement. The second type considers the placement of multiple media data with the same broadcast cycle. The advantage of this type is not only the optimization of data placement but also a greater efficiency as a result of increased space in the direct access device which is made possible by placing several data files at the same time. The third type considers placement of multiple media data with different broadcast cycles according to the actual situations of media broadcasting. The three types of data placement can be selected according to the different situations of the cyclic broadcasting media so as to increase the efficiency of utilizing the space of the direct access device.

To help understand more clearly the method and the operation of the inventive data placement method, the parameters of the direct access device and of the media data, that will be used in the following description of the present invention, are explained first as follows:

Parameters for Direct Access Devices
Ca: the capacity of the direct access device (in KB)
D: the desirable bandwidth of the direct access device (in KB/sec)
$D_{eff}$: the effective bandwidth of the direct access device (in KB/sec)
Tr: the number of tracks containing data in the direct access device
$S_{full}$: the full length of search time of the direct access device (in sec)
$S_{tt}$: the track to track search time of the direct access device (in see)
S(k): the time the read/write head takes to cross k number of magnetic tracks (in sec)
RPS: the rotation speed of the read/write head (in rps)

Parameters for Media Data
$L_i$: the length of the $i^{th}$ media data (in KB)
$P_i$: the time difference in broadcasting the $i^{th}$ media data between each channel (in the unit of the length of the file—KB)
$C_i$: the total number of channels broadcasting the $i^{th}$ media data
$B_i$: the size of the block defined by the $i^{th}$ media data (in KB)
$B_{i,j}$: the $j^{th}$ block of the $i^{th}$ media data
$R_i$: the speed of the data consumption of the $i^{th}$ media data (in KB/sec)
$CaN_i$: the minimum number of direct access devices required for storing the $i^{th}$ media data
$DN_i$: the minimum number of direct access devices required by the $C_i$ number of channels for broadcasting the $i^{th}$ media data.

First Embodiment of the Present Invention

The steps of implementing the data placement of a single media data are as follow. First, the media data has to be divided. The size of the block is assumed, while dividing the data, to be an integral multiple of the track. Such an assumption is typical for media data. In this manner, it is possible to eliminate the rotational latency of the direct access device by utilizing the read-ahead property of the direct access device. At the same time, the direct access device is also formatted, such that all the blocks have the same size to facilitate the placement of data. After this, supplemental data, such as commercials and previews, are added so that $$\frac{L_i}{C_i \cdot B_i}$$

becomes an integer. In other words, the media data is supplemented so that it can be simultaneously divided by the size of the blocks defined by the media data and by the number of channels. From the example in the above-mentioned FIG. 5, it can be noted that the direct access device searches only once during such function. Thus, it is possible to calculate the effective bandwidth of the direct access device to achieve:

$$D_{eff} = \frac{Ca}{\frac{T_r}{RPS} + S_{tt} \cdot (T_r - 1) + S_{full}}$$

From the supporting bandwidth, the minimum number of the direct access devices for the $C_i$ number of channels in broadcasting the $i^{th}$ media data can be calculated as follows:

$$DN_i = \left[\frac{C_i \cdot R_i}{D_{eff}}\right]$$

In addition, in consideration of storage capacity, the minimum number of direct access devices required for storing the $j^{th}$ media data can be calculated as follows:

$$CaN_i = \left[\frac{L_i}{Ca}\right]$$

With these two conditions, the number of direct access devices that has to be installed will be the greater of the number of direct access devices required by the bandwidth and the number of direct access devices required by the capacity, namely, Max($CaN_i$, $DN_i$). Using a mathematic equation, the blocks can be labeled as $B_{i,0}, B_{i,1}, B_{i,2}, \ldots, \ldots, B_{i,\frac{C_i P_i}{B_i}-1}$.

To calculate the placement positions of the blocks, blocks from $B_{i,j}$ to $B_{i,q}$ are assumed to be placed in one direct access device, where $$p < q, \; p \in \left\{ o, \frac{P_i}{B_i}, 2 \cdot \frac{P_i}{B_i}, \ldots \right\}, \; q \in \left\{ \frac{P_i}{B_i} - 1, 2 \cdot \frac{P_i}{B_i} - 1, 3 \cdot \frac{P_i}{B_i} - 1, \ldots \right\}.$$

Therefore, block $B_{i,j}$ of the $i^{th}$ media data can obtain an r value through the following equation, where the r value indicates that block $B_{i,j}$ is placed on the $r^{th}$ physical block in the direct access device:

$$r = \frac{q-p+1}{P_i/B_i} \cdot \left( (j-p) \bmod \frac{P_i}{B_i} \right) + \left[ \frac{j-p}{P_i/B_i} \right]$$

where $p \leq j \leq q$.

To keep within the limit of the capacity, the above equation must satisfy the following condition: $B_i \cdot (q-p+1) \leq Ca$. Further, to keep within the limit of the bandwidth, it must also satisfy the following condition:

$$\frac{q-p+1}{P_i/B_i} \leq \frac{D_{\mathit{eff}}}{R_i}.$$

As previously stated, the inventive data placement method utilizes dual buffer technology. Thus, the size of the buffer required by each channel is $2 \cdot B_i + S_{\mathit{full}} \cdot R_i$, where the buffer of $S_{\mathit{full}} \cdot R_i$ is used to compensate the consumption during the last search by the direct access device.

In the following discussion, an actual example of broadcasting a movie is taken to explain how the present invention is applied to a single media data. Assume that a movie of 132 minutes and in MPEG-2 format is broadcast on 14 channels. The relevant magnetic disk parameters and movie parameters are listed below:

Magnetic Disk Parameters

Magnetic Disk Capacity=2000000 KB

Effective Magnetic Disk Bandwidth=4000 KB/sec

Full Length Magnetic Disk Search Time=0.018 sec

Length of Movie (KB) (with a supplement of 8 minutes)= 140·60·6Mbps/8

Movie Parameters

Broadcast Interval between Channels (in KB of the file length)=10·60·8Mbps/8

Number of Channels=14

Size of Blocks=64 KB

Data Consumption Speed (KB/sec)=6000 Kbps/8

Since $$CaN_i = \left\lceil \frac{140 \cdot 60 \cdot 6 \, \text{Mbps}/8}{2000000 \, \text{KB}/1024} \right\rceil = 4,$$

at least four disks are needed if the movie's requirement for capacity is to be considered.

Since $$DN_i = \left\lceil \frac{14 \cdot 6000 \, \text{Kbps}/8}{4000 \, \text{KB}} \right\rceil = 3,$$

at least three disks are needed if the movie's requirement for bandwidth is to be considered.

Since Max($CaN_i, DN_i$)=4, the actual number of disks to be installed is 4.

The number of block intervals between channels is $$\frac{750 \, \text{KB/s} \cdot 60 \cdot 140}{64 \, \text{KB} \cdot 14} = 7032 \, \text{blocks}.$$

The total number of blocks is: 7032·14=98448.

Figure 8:
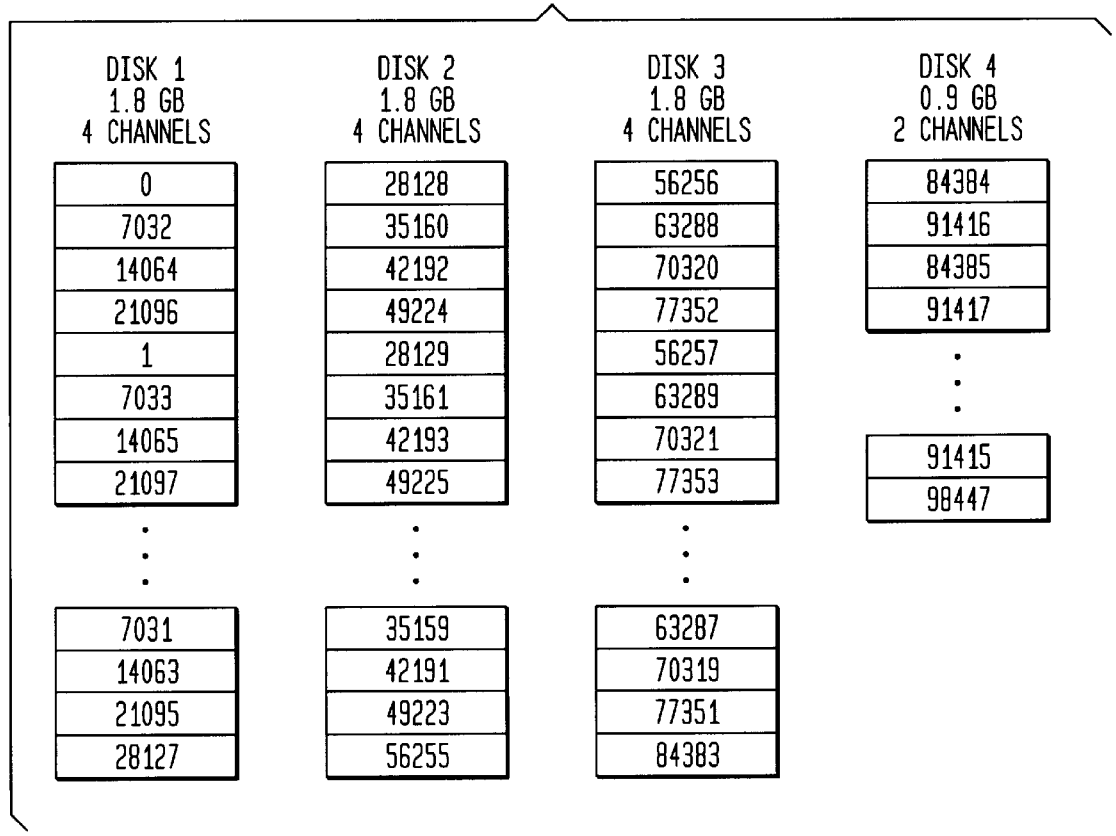
FIG. 8 illustrates the inventive data placement of a single movie according to a first embodiment of the present invention.

When the data placement method of the present invention is used, the data placement situation is shown in FIG. 8, wherein the buffer requirement of each channel is 2·64 KB+0.018·750 KB=142 KB.

In the actual embodiment of the present invention shown in FIG. 8, the issue of placing the above-mentioned movie in four magnetic disks is considered. From previous calculations, it is known that the bandwidth of a single magnetic disk is capable of supporting broadcast on four channels. The channels are therefore allocated in the format of 4, 4, 4, 2. The first 14 blocks to be accessed can thus be placed in four disks, and the next 14 blocks to be accessed can be placed in four disks as well, etc. At the time the system is initiated, the first three disks access four blocks, and the forth disk accesses two blocks during each service cycle, making a total of 14 blocks for use by 14 channels.

The placement of a single media data on one or multiple direct access device(s) is now explained. This design of placing a single media data on direct access devices is fairly easy to manage; however, much of the space on the direct access device can be wasted. Therefore, the present invention proposes an improved design whereby several media data are placed simultaneously. For placement of multiple media data, it is assumed that the broadcast cycle of each media data has a multiple relationship, in other words, $$\frac{P_i}{\text{Min}(P_i)} = \mathit{integer}.$$

For example, the more popular media can be placed on more channels and have a broadcast interval of five minutes, whereas, the broadcast interval for less popular media data can be ten minutes, fifteen minutes, twenty minutes, etc. In the present invention, the broadcast intervals are assumed to have a single integral multiple relationship. When the media data is not long enough, it can be supplemented with commercials or previews as desired.

For placement of multiple media data, two methods are disclosed in the present invention. The first is the placement of multiple media data having the same broadcast cycle, in accordance with the second embodiment of the present invention. The second is the placement of multiple media data having different broadcast cycles, in accordance with the third embodiment of the present invention.

Second Embodiment of the Present Invention

According to this method, all media data having the same broadcast cycle $P_i$ are classified and then written at the same time. This kind of media data are divided into blocks, where all the blocks of the media data are then classified into groups. The blocks of the same group are placed sequentially on a single or several direct access devices. Adjacent block groups are also placed in a continuous state, so that the data placement is still optimized and the read/write head need only generate one search on the direct access device. The blocks of media data having the same broadcast cycle are defined as j and are written into groups of y. The relationship between y and j is as follows:

$$y = \left(j \bmod \frac{P_i}{B_i}\right)$$

Thereafter, the data of the same group are placed together, while the adjacent groups are placed sequentially. The result is optimized data placement. The data placement technique using multiple media data having the same broadcast cycle is illustrated in FIG. 9.

Figure 9:
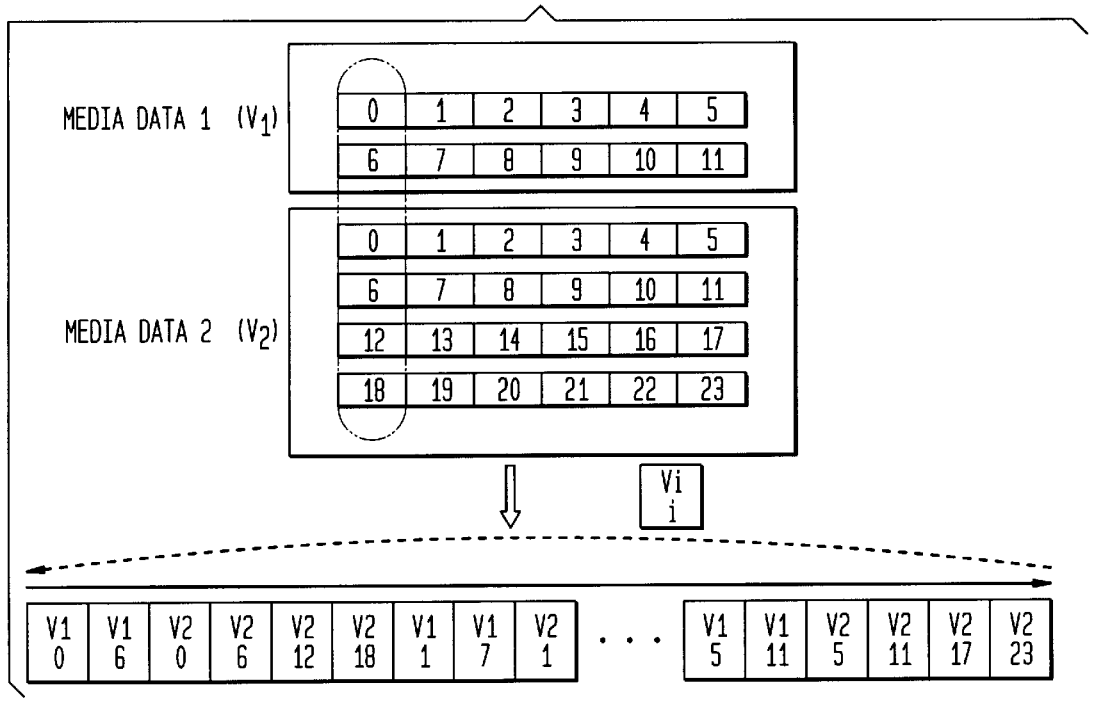
FIG. 9 illustrates the inventive data placement of multiple movies with the same broadcast cycle according to a second embodiment of the present invention.

In FIG. 9, media data 1 is a movie with a length of 12 blocks, which is to be broadcast on two channels, each having a broadcast cycle of 6 blocks. Media data 2 is a movie with a length of 24 blocks, which is to be broadcast on four channels, each having a broadcast cycle of 6 blocks. Since the two media data have the same broadcast cycle, they are grouped together.

According to the above-mentioned equation, blocks 0, 6 of media data 1 and blocks 0, 6, 12, and 18 of media data 2 can be grouped together and placed sequentially. Thereafter, blocks 1, 7 of media data 1 and blocks 1, 7, 13 and 19 of media data 2 are grouped and placed together, etc. Using this method of data placement, the system can continuously access blocks 0, 6 of media data 1 and blocks 0, 6, 12, and 18 of media data 2 to feed the six channels. When the first service cycle is finished, blocks 1, 7 of media data 1 and blocks 1, 7, 13 and 19 of media data 2 will be accessed, and so on. When the direct access device completes the process to access blocks 5, 11 of media data 1 and blocks 5, 11, 17, and 23 of media data 2, the read/write head can return to the first block to continue accessing data, similar to the accessing of single media data previously discussed.

As shown in FIG. 9, the media data are divided into blocks. All the blocks that can be accessed at the same time are grouped together. Since this embodiment relates to media data having the same broadcast cycle, the blocks on the same relative positions will be accessed continuously. After the grouping is done, the data in the same group are placed sequentially and the adjacent groups are placed sequentially as well, so that the system will not initiate a search of the direct access device when accessing the data.

Since several media data are placed at the same time, the requirements for capacity and bandwidth are necessarily increased. The number of direct access devices needed therefore should be calculated. In view of the capacity of the direct access devices, the total capacity for all the media data is $$CaN_x = \left\lceil \frac{\sum_{i=1}^{k} L_i}{Ca} \right\rceil.$$

In view of the bandwidth of the direct access devices, the number of channels to be supported is $$DN_x = \left\lceil \frac{\sum_{i=1}^{k} L_i}{Ca} \right\rceil,$$

wherein parameter x stands for the requirements of capacity and bandwidth for the x type of direct access devices and parameter k stands for the total amount of data for the x type of multiple media data.

At this point, since the data placement has previously been optimized for the direct access devices, the effective bandwidth can be viewed as:

$$D_{\it eff} = \frac{Ca}{\frac{T_r}{RPS} + S_{tt} \cdot (T_r - 1) + S_{full}}.$$

Third Embodiment of the Present Invention

According to this embodiment, the media data having different broadcast cycles are grouped and placed together. First, the media data are defined as segments, where the length of each segment is the shortest cycle time of the media data:

$$Sg_i = \frac{P_i}{\text{Min}(P_i)}$$

In another example, there are three media data files, with the cycle of media data 1 being 3 minutes, the cycle of media data 2 being 6 minutes and the cycle of media data 3 being 9 minutes. All three media data are divided into segments of three minutes. Then, the media data are defined into blocks and grouped together according to the following equation, wherein block j belongs to group y.

$$y = \left((j \bmod Sg_i) \bmod \frac{\text{Min}(P_i)}{B_i}\right)$$

The blocks of the same group are placed sequentially, while the adjacent groups are also placed sequentially. This definition is intended to reduce the search time of the direct access devices.

Figure 10:
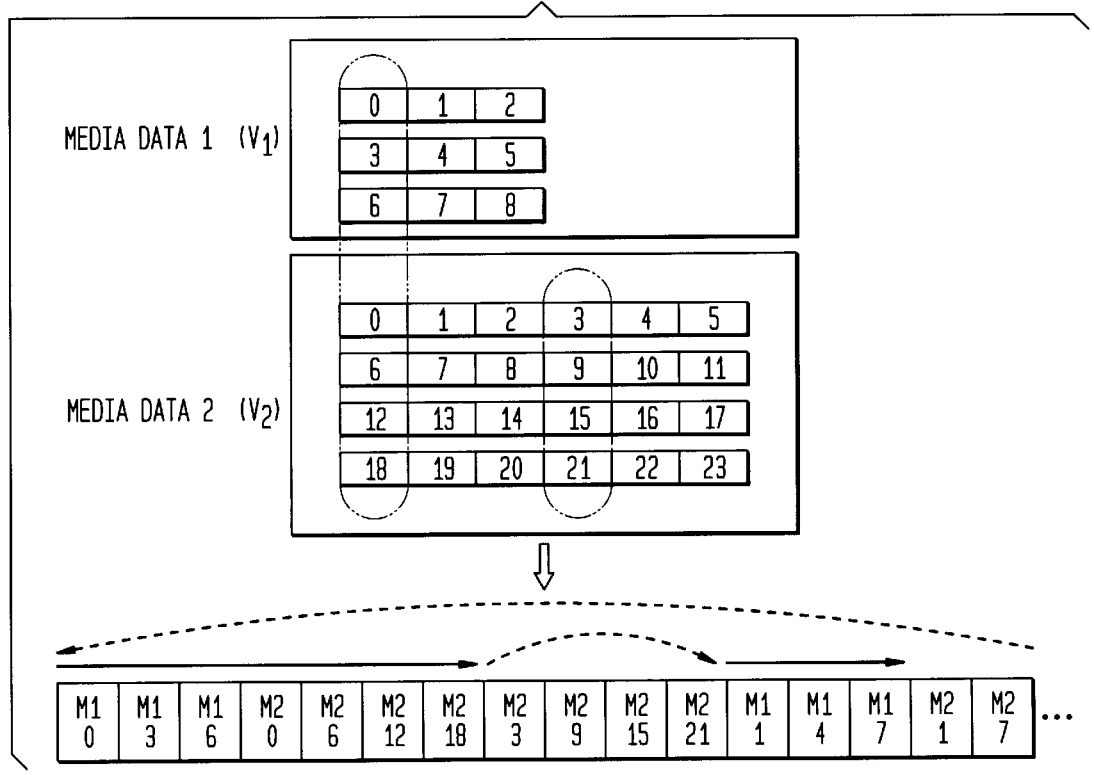
FIG. 10 illustrates the inventive data placement of multiple movies with different broadcast cycles according to a third embodiment of the present invention.

FIG. 10 illustrates an example of the third embodiment of the present invention for data placement of multiple media data having different broadcast cycles. In FIG. 10, the length of media data 1 is 9 blocks, which is to be broadcast on three channels having a broadcast cycle of 3 blocks, and the length of media data 2 is 24 blocks, which is to be broadcast on 4 channels having a broadcast cycle of 6 blocks.

In the process of grouping the blocks, blocks 0, 3, and 6 of media data 1 and blocks 0, 6, 12 and 18 of media data 2 are grouped together, and blocks 3, 9, 15 and 21 of media data 2 are placed sequentially.

In the process of data accessing, blocks 0, 3 and 6 of media data 1 and blocks 0, 6, 12 and 18 are first accessed to feed the three channels of media data 1 and the four channels of media data 2, respectively. Since blocks 3, 9, 15 and 21 of media data 2 are also placed together, only one search is necessary to find the blocks of the second group with which to continue the process of data accessing. When all data has been accessed, media data 1 will return to the initial blocks of 0, 3 and 6 after having accessed blocks 2, 5 and 8, and media data 2 will return to the initial blocks of 3, 9, 15 and 21 after having accessed blocks 2, 8, 14 and 20. Since blocks 3, 9, 15 and 21 of media data 2 and blocks 0, 3 and 6 of media data 1 are grouped together, it is possible to return to the initial blocks of 0, 3 and 6 of media data 1 and the initial blocks of 0, 9, 15 and 21 of media data 2. In this way, the search time of the direct access device is reduced.

In the example in FIG. 10, the media data are first divided into segments of three blocks.

Then, the blocks in all the segments that can be accessed at the same time are grouped together, and the data of the same group are placed sequentially, so that the system can ensure that all the blocks that are accessed at the same time can be found in the same group during the process of accessing data. This method of data placement makes it possible to minimize the searching of the direct access devices, while the data is being accessed.

From the explanation of the two foregoing examples, it can be noted that the number of searches of direct access devices is dependant on the number of segments containing the same media data in the same block group. If the same media data is contained in only one segment in the group, no extra search is necessary. As shown in FIG. 9, two media data files have the same cycle and therefore do not have to be segmented. Thus, the data in the group does not have to be searched again. On the other hand, in FIG. 10, the cycle of media data 2 is twice that of media data 1, and media data 2 therefore has to be divided into two segments to coincide it with media data 1 before being grouped. Only one search is then necessary in the block group.

The effective bandwidth of a direct access device using this data placement strategy is calculated again with the following output:

$$\Phi = \Sigma Sg_{i,j} - SM \cdot \text{Min}(Sg_{i,j})$$

is defined as the variation of each media data segment in a block group, namely, the number of searches in the block group by the read/write head. In FIG. 9, $$\Phi = \Sigma Sg_{i,j} - SM \cdot \text{Min}(Sg_{i,j}) = (1+1) - (1+1) = 0$$

In FIG. 10, however, $$\Phi = \Sigma Sg_{i,j} SM \cdot \text{Min}(Sg_{i,j}) = (2+1) - (1+1) = 1$$

where the effective bandwidth of which is:

$$D_{\text{eff}} = \frac{Ca}{\frac{T_r}{RPS} + S_{tt} \cdot (T_r - 1) + S_{\text{full}} + \Phi \cdot S\left(\frac{T_g}{\Phi}\right)}$$

-continued $$T_g = \sum_{i=1}^{SM} (C_i \cdot B_i \cdot Sg_i)$$

Thus, the number of direct access devices required can be calculated from the requirements of bandwidth and capacity of the direct access devices.

$$CaN = \left\lceil \frac{\sum_{i=1}^{SM} L_i}{Ca} \right\rceil$$

$$DN = \left\lceil \frac{\sum_{i=1}^{SM} C_i \cdot R_i}{D_{\text{eff}}} \right\rceil$$

The present invention can be used not only in the above-mentioned Near Video-on-Demand (NVOD) system and the broadcast of movies, as explained in the foregoing examples, but also in any system that is capable of cyclic re-broadcast service, such as broadcast of music on a cable television network or a multicast system over a local area network that allows random access of video and audio data. In all these systems, the optimized data placement according to the present invention can be used to reduce the cost of the system's architecture.

Finally, the above-discussion is intended to be merely illustrative of the invention. Numerous alternative embodiments may be devised by those having ordinary skill in the art without departing from the spirit and scope of the following claims.

What is claimed is:

1. A method of data placement of media data on at least one direct access device for a media server having a cyclic re-broadcast property, wherein the cyclic re-broadcast property refers to a repetitive broadcast on multiple broadcast channels in a cyclic manner having a fixed time interval between channels, said method comprising the steps of:

a. adjusting said media data so that its length can be divided integrally based on a predetermined number of fixed blocks and on the number of broadcast channels, said wherein predetermined number of blocks being an integral multiple of the number of tracks of said at least one direct access device;

b. dividing said media data by said predetermined number of blocks;

c. formatting said at least one direct access device into blocks of said predetermined number; and d. sequentially placing on said at least one direct access device the blocks that have been divided by said predetermined number, such that said blocks can be sequentially and continuously accessed, wherein an effective bandwidth, $D_{\text{eff}}$, of said at least one of said at least one direct access device is based on:

$$D_{\text{eff}} = \frac{Ca}{\frac{T_r}{RPS} + S_{tt} \cdot (T_r - 1) + S_{\text{full}}}$$

wherein $D_{\text{eff}}$ is measured in KB/sec, Ca is the total capacity of at least one direct access device measured in KB, Tr is the number of tracks having stored data in said at least one direct access device, RPS is the rotation speed of at least one read/write head measured in rps, $S_{tt}$ is the track to track search time of said at least one direct access device measured in sec, and $S_{full}$ is the full length of search time of said at least one direct access device measured in sec.

2. The method of data placement as in claim 1, wherein the number of said at least one device is greater than or equal to Max(CaN$_{i, DNi}$), where $$CaN_i = \left[\frac{L_i}{Ca}\right],$$

and $$DN_i = \left[\frac{C_i \cdot R_i}{D_{eff}}\right]; \text{ and } \frac{L_i}{C_i \cdot B_i} \text{ is an integer;}$$

wherein, CaN$_i$ is the minimum number of direct access devices required for storing the i$^{th}$ media data file, DN$_i$ is the minimum number of said at least one direct access device required by the Ci number of channels for broadcasting the i$^{th}$ media data, C$_i$ is the total number of channels broadcasting the i$^{th}$ media data, L$_i$ is the length of the i$_{th}$ media data measured in KB, R$_i$ is the speed of the data consumption of the i$^{th}$ media data measured in KB/sec, and B$_i$ is the size of the block defined by the i$^{th}$ media data measured in KB.

3. A method of data placement as in claim 2, wherein the placement position of any block r is:

$$r = \frac{q-p+1}{P_i/B_i} \cdot \left((j-p)\mod\frac{P_i}{B_i}\right) + \left[\frac{j-p}{P_i/B_i}\right]$$

where $p \leq j \leq q$, $B_i \cdot (q-p+1) \leq Ca$, and $\frac{q-p+1}{P_i/B_i} \leq \frac{D_{eff}}{R_i}$;

wherein P$_i$ is the time difference in broadcasting the i$^{th}$ media data between each channel measured in KB, B$_{i,j}$ is the j$^{th}$ block of the i$^{th}$ media data, and r is the placement block position of B$_{i,j}$.

4. The method of data placement as in claim 3, wherein the size of a buffer for each of said channels is based on $2 \cdot B_i + S_{full} \cdot R_i$.

5. The method of claim 1, wherein at least one of said at least one direct access device is one of a magnetic disk, a magnetic disk array, and a read and write optical disk.

6. A method of data placement of multiple media data on at least direct access device for a media server having a cyclic re-broadcast property, wherein said multiple media data of said media server are repetitively broadcast in cycles over multiple broadcast channels having a fixed time interval between channels, said method comprising the steps of:

a. adjusting each of said multiple media data so that its length can be divided integrally based on predetermined number of fixed blocks and on the total number of said broadcast channels, said predetermined number of blocks being an integral multiple of the number of tracks of said at least one direct access device;

b. defining the multiple media data having the same broadcast cycle as the same type and dividing the same type media data by said predetermined number of blocks;

c. formatting said at least one direct access device of the same kind into blocks of said predetermined number; and d. defining as groups, the blocks of said multiple media data of the same type that can be accessed simultaneously and placing them sequentially on said at least one direct access device, wherein the grouping of the blocks of said multiple media data of the same type is based on:

$$y = \left(j \mod \frac{P_i}{B_i}\right)$$

wherein y is the group to which block j of the i$^{th}$ media data belongs, j is the j$^{th}$ block of the i$^{th}$ media data, P$_j$ is the access time interval between the channels of the i$^{th}$ media data measured in KB, and B$_i$ is size of a block defined by the i$^{th}$ media data and measured in KB.

7. The method of data placement as in claim 6, wherein an effective bandwidth, D$_{eff}$, achievable by said at least one direct access device is based on:

$$D_{eff} = \frac{Ca}{\frac{T_r}{RPS} + S_{tt} \cdot (T_r - 1) + S_{full}}$$

wherein D$_{eff}$ is measured in KB/sec, Ca is the total capacity of said at least one direct access device measured in KB, Tr is the number of tracks having stored data in said at least one direct access device, RPS is the rotation speed of at least one read/write head measured in rps, S$_{tt}$ is the track to track search time of said at least one direct access device measured in sec, and S$_{full}$ is the full length of search time of said at least one direct access device measured in sec.

8. The method of data placement as in claim 7, wherein the number of said at least one direct access device is greater than or equal to:

Max(CaNx, DNx)

where $CaNx = \left[\dfrac{\sum_{i=1}^{SM} L_i}{Ca}\right]$, and $DNx = \left[\dfrac{\sum_{i=1}^{SM} C_i \cdot R_i}{D_{eff}}\right]$, where $\dfrac{L_i}{C_i \cdot B_i}$ is an integer;

wherein, CaNx is the minimum number of said at least one direct access device required for storing the x$^{th}$ kind of media data, DNx is the minimum number of said at least one direct access device on $$\sum_{i=1}^{k} C_i$$

number of channels that provide the means for broadcasting the i$^{th}$ media data, R$_i$ is the consumption speed of the data bus of the i$_{th}$ media data, measured in KB/sec, L$_i$ is the length of the data of the i$^{th}$ media data measured in KB, and B$_i$ is the size of the blocks defined by said i$^{th}$ media data measured in KB.

9. The method of claim 6, wherein at least one of said at least one direct access device is one of a magnetic disk, a magnetic disk array, and a read and write optical disk.

10. A method of data placement of multiple media data on at least one direct access device for a media server having a cyclic re-broadcast property, wherein said multiple media data of said media server are repetitively broadcast in cycles over multiple broadcast channels, each channel having a separate fixed time interval, said method comprising the steps of:

a. adjusting each of said multiple media data so that its length can be divided integrally based on a predetermined number of fixed blocks and on the total number of said broadcast channels, said predetermined number of blocks being an integral multiple of the number of tracks of said at least one direct access device;

b. dividing said multiple media data with the predetermined number of blocks;

c. formatting said at least one direct access device into said predetermined number of blocks;

d. segmenting and grouping said multiple media data having the smallest fixed time interval; and e. sequentially placing on said at least one direct access device the groups of said multiple media data that can be accessed simultaneously, wherein the grouping of the blocks of said multiple media data is based on:

$$y = \left( (j \bmod Sg_i) \bmod \frac{\text{Min}(P_i)}{B_i} \right)$$

$$\text{wherein } Sg_i = \frac{P_i}{\text{Min}(P-i)}, \text{ and } \frac{P_i}{\text{Min}(P_i)} = \text{integer}$$

wherein y is the group to which block j belongs, $Sg_i$ is the number of segments into which the re-broadcast cycle section of the $i^{th}$ media data must be divided, and $P_i$ is the broadcast time interval between channels of the $i^{th}$ media data measured in KB.

11. A method of data placement as in claim 10, wherein the size of an effective bandwidth $D_{eff}$ of said at least one direct access device is based on:

$$D_{eff} = \frac{Ca}{\frac{T_r}{RPS} + S_{tt} \cdot (T_r - 1) + S_{full} + \Phi \cdot \frac{T_r}{T_g} \cdot S\left(\frac{T_g}{\Phi}\right)}$$

$$\text{where } T_g = \sum_{i=1}^{SM} (C_i \cdot B_i \cdot Sg_i), \text{ and}$$

$$\Phi = \sum Sg_{i,j} - SM \cdot \text{Min}(Sg_i)$$

wherein $D_{eff}$ is measured in KB/sec, Ca is the total capacity of said at least one direct access device measured in KB, Tr is the number of tracks containing data in said at least one direct access device, RPS is the rotation speed of a read/write head of said at least one direct access device measured in rps, $S_{tt}$ is the track to track search time of said at least one direct access device measured in sec, $S_{full}$ is the full length of search time of said at least one direct access device measured in sec, $\Phi$ is the number of search time of the read/write head in the block group of said multiple media data, $T_g$ is the total number of tracks in the block group, $C_i$ is the total number of channels broadcasting the $i^{th}$ media data, $B_i$ is the size of the block defined by the $i^{th}$ of said media data measured in KB, $Sg_{i,j}$ is the number of segments allocated to the $j^{th}$ block group by an $i^{th}$ movie, and SM is the total number of said media data.

12. The method of data placement as in claim 11, wherein the number of said at least one direct access device is greater than or equal to:

$$\text{Max}(CaN, DN)$$

$$\text{where } CaN = \left\lceil \frac{\sum_{i=1}^{SM} L_i}{Ca} \right\rceil, \text{ and}$$

$$DN = \left\lceil \frac{\sum_{i=1}^{SM} C_i \cdot R_i}{D_{eff}} \right\rceil,$$

$$\text{where } \frac{L_i}{C_i \cdot B_i} \text{ is an integer,}$$

wherein CaN is the minimum number of said at least one direct access device required for storing all media data, DN is the minimum number of said at least one direct access device on all channels that provide means for broadcasting all media data, $R_i$ is the data consumption speed of a data bus of the $i^{th}$ media data measured in KB/sec, and $L_i$ is the length of $i^{th}$ media data measured in KB.

13. The method of claim 10, wherein at least one of said at least one direct access device is one of a magnetic disk, a magnetic disk array, and a read and write optical disk.

* * * * *